Figure 1:
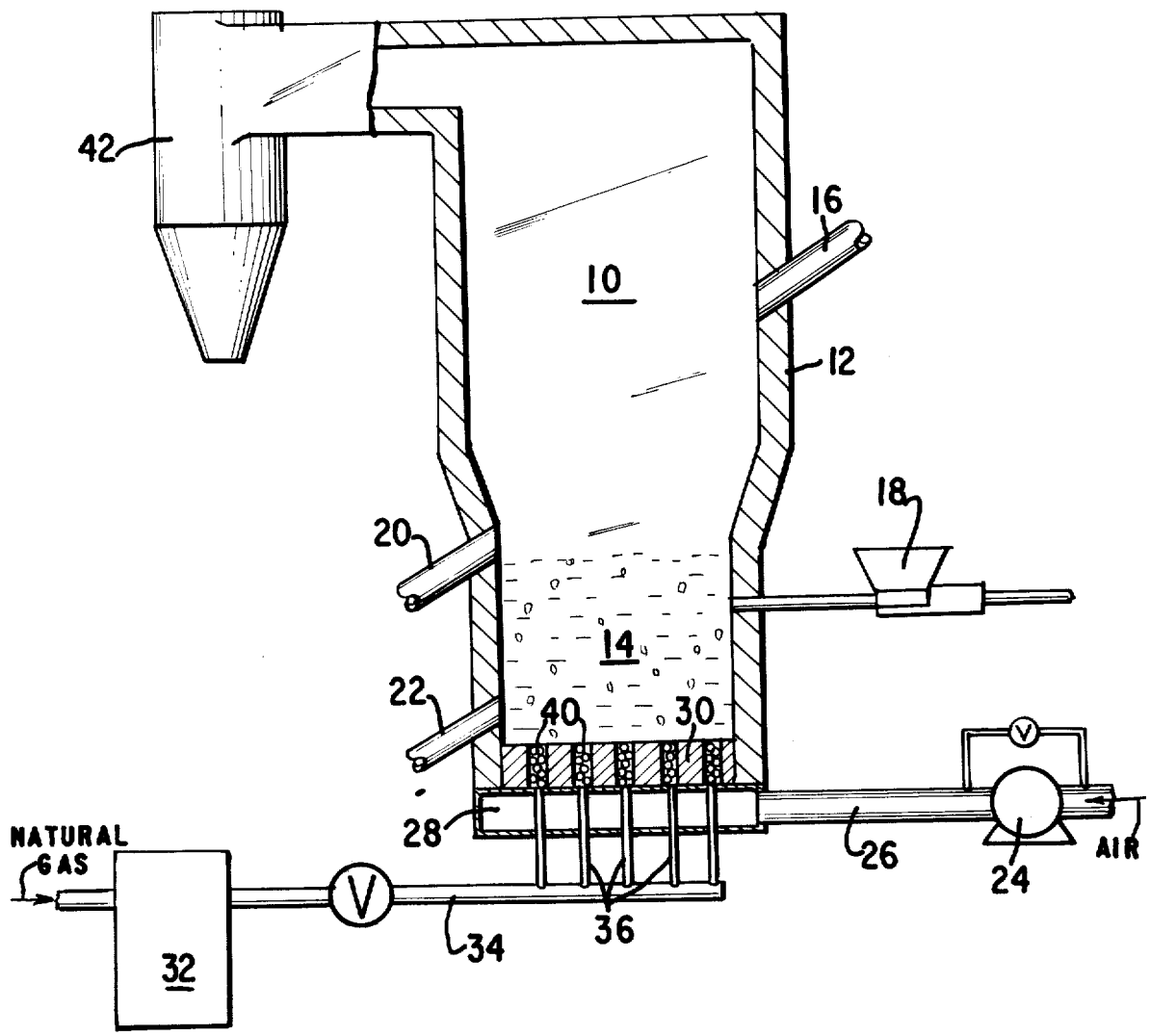

United States Patent [19]

Hollingsworth et al.

[11] 3,925,024

[45] Dec. 9, 1975

[54] GRID BURNER SYSTEM

[75] Inventors: Clinton Allen Hollingsworth; John Harold Snyder, both of Lakeland, Fla.

[73] Assignee: Borden, Inc., Columbus, Ohio

[22] Filed: Sept. 10, 1971

[21] Appl. No.: 179,494

[52] U.S. Cl. ............... 23/277 R; 23/284; 23/288 S; 431/326; 34/57 A; 432/58; 165/104; 263/21 A
[51] Int. Cl.[2] ..................... F27B 15/10; B01J 8/24
[58] Field of Search... 23/277 R, 284, 288 S, 288 K, 23/288 E; 431/326, 328, 170, 7; 34/57 R, 57 A; 165/104; 432/58

[56] References Cited
UNITED STATES PATENTS

| | | | |
|---|---|---|---|
| 1,216,096 | 2/1917 | Ellis | 431/328 |
| 1,241,111 | 9/1917 | Hayes | 431/328 |
| 2,610,842 | 9/1952 | Schoenmakers et al. | 23/288 S X |
| 2,729,428 | 1/1956 | Milmore | 34/57 A X |

Primary Examiner—James H. Tayman, Jr.
Attorney, Agent, or Firm—George P. Maskas; George A. Kap; Daniel D. Mast

[57] ABSTRACT

Fluid bed reactor includes a grid provided with fuel-air mixing chambers filled with packing ½ to 2.5 inches in size. The mixing chambers, which are preferably cylindrical, are 1 to 6 inches in diameter and up to 18 inches in length. Total open area per square foot of the grid is from 3 to 14 in$^2$. The outstanding feature of the reactor resides in the fact that burning of the fuel-air mixture occurs within the fluidized bed just above the grid whereas in the past, considerable burning occurred above the fluidized bed with the consequent reduced fuel utilization.

13 Claims, 2 Drawing Figures

GRID BURNER SYSTEM

This invention relates to a novel grid and to fluid bed reactors provided with such novel grids. More particularly, this invention pertains to fluid bed reactors provided with grids having a plurality of mixing chambers associated with interference means which enable fuel and air to mix within the chambers and effect combustion as the fuel-air mixture leaves the chambers at a point immediately above the grid, which reactors provide increased burning efficiency and concomitantly, increased production. In pilot plant operations, increased production in excess of 25% has been achieved.

In fluid bed reactors of medium to large diameters ranging from 8 to 50 feet, the depth of the fluidized mass may be from 3 to 10 feet and preferably 4 to 7 feet. When the reactions being carried out involve a coarse particle size distribution, as in the clinkering of Portland cement raw materials, the defluorination of phosphates, etc., the operation requires a high aeration rate to maintain the proper fluidity of the particles. In such circumstances, the aerating gas, which is ordinarily air or air enriched with oxygen, enters the fluid bed at the bottom through the grid and passes upward through the fluid bed in less than 2 or 3 seconds, and frequently in only a fraction of a second. When fuel is injected into such a fluidized mass through the wall of the reactor, as has been the common practice, it is not possible for the fuel and air to combine and mix in the central part of the mass. If fuel is supplied at the stoichiometric rate, burning with insufficient air occurs in the peripheral section of the mass and partially burned fuel combines above the mass with air issuing from the center of the mass so that flames and excessive temperatures occur above the mass and the heat generation within the mass is reduced. To avoid the conditions described, it is necessary to reduce the rate of fuel supply but this results in operation with excess air causing lower fuel efficiency and reduced reactor capacity. The same undesirable conditions develop when fuel is injected into the fluidized mass at points too far apart, so that large sections of the mass are without fuel supply.

The conditions mentioned always occur in large reactors in which the fuel is injected into the mass through the reactor walls and may occur with other fuel injection arrangements not specially designed to meet the requirements indicated.

In carrying out high-temperature sintering in fluid bed reactors, as in the preparation of cement clinker or the defluorination of phosphate rock, a bed of granular material is maintained in a fluidized state within the reactor having essentially vertical walls and having a perforated grid for a floor. The fluidizing medium passing upward through the grid is usually air which may be preheated by passing it through a suitable heat exchanger or by burning fuel in it in a preheating furnace. In the latter case, such fluidizing gas is a mixture of air and products of combustion.

The air passing through the grid is normally not allowed to exceed a temperature in excess of about 1400°F for a number of practical reasons. Firstly, temperatures above 1400°F would impose severe heat-induced stresses on the grid; and thermal efficiency of such an arrangement would be reduced because much heat would be lost before the fluidizing gas could be brought into contact with the material to be treated. It is, therefore, customary to provide the balance of the heat required for high-temperature operations by introducing a suitable fuel directly into the fluidized bed and carrying out the combustion within the bed itself.

It should be evident that the level within the bed at which combustion occurs has an important bearing on the efficiency of the operation. If all of the gas were made to burn at the bottom of the bed in the immediate neighborhood of the grid, then the hot products of combustion passing upward through the entire body of the fluidized bed would have the most beneficial effect. If, however, some of the fuel passes unburned through the body of the bed and some of the combustion takes place near the top of the bed or even above the bed, then thermal efficiency of the operation would be diminished significantly.

Besides the present invention, the only other means of coping with this problem is either to live with the decreased thermal efficiency or to promote burning deeper within the bed by adding free oxygen to the fluidizing air, which involves added cost.

Another approach which was considered and studied experimentally in conjunction with a fluid bed reactor was one in which combustion was carried out within the grid itself by providing the grid with combustion chambers into which the fluidizing air and fuel for combustion were introduced. The hot products of the combustion issuing from the combustion chambers then were to have served to carry out the high-temperature reaction. A key feature of this line of approach, since abandoned, was to make the combustion chambers within the grid highly efficient so that the combustion was all to have taken place prior to introduction of the hot gases to the bed. It is evident that when such procedures are used, extremely high temperatures approaching theoretical flame temperature may be attained in the gas phase.

Under these conditions, the hot gases cause the refractory surfaces of the combustion chambers and adjacent portions of the grid surface to be heated to temperatures beyond the fusion point of the material in the fluid bed. Although gas velocities in the combustion chambers are sufficiently high enough to substantially exclude bed material from the combustion chambers, when stray particles enter the combustion chambers and impact on the superheated surfaces, they immediately fuse and adhere to the inner surface of the combustion chambers. Over a period of time, accretions of fused debris continue to form filling the combustion chambers until the flow of gas is totally impeded, thus shutting down the reactor.

To promote burning within the fluidized bed, Pyzel U.S. Pat. No. 3,361,539 discloses a fluid bed reactor in which the fuel is injected into the fluidized bed through the bottom thereof at relatively closely spaced points so that the fuel and air are caused to mix by the turbulence of the fluidized bed. Pyzel maintains that substantially complete combustion is effected within the fluidized bed even when the fuel rate is close to the stoichiometric rate, based on the oxygen of the air used, and that no burning of consequence occurs in the reactor above the mass.

There is no question that Pyzel's fluid bed reactor provides better control of combustion than in the past and reduces burning above the fluid bed, however, the problems still persist though to a lesser degree. Even with Pyzel's reactor, burning of the fuel-air mixture takes place well above the grid and a considerable amount of it takes place above the fluidized bed with the consequent loss of heat generation and waste of fuel due to inefficient combustion.

With the novel fluid bed reactor disclosed herein, problems inherent with the prior art reactors have been overcome by controlling mixing of fuel and air so that combustion thereof occurs just above the level of the grid.

It is, therefore, an object of this invention to provide a fluid bed reactor which affects efficient burning of the combustion mixture just above the reactor grid and which thus allows the mixture of air and products of combustion to contact the particles in the fluidized bed.

It is another object of this invention to provide mixing chambers of appropriate size in the reactor grid and to fill the chambers with regular and or irregular geometric shapes to promote mixing of fuel and air passing therethrough so that substantial combustion takes place at about the level of the grid.

Figure 2:
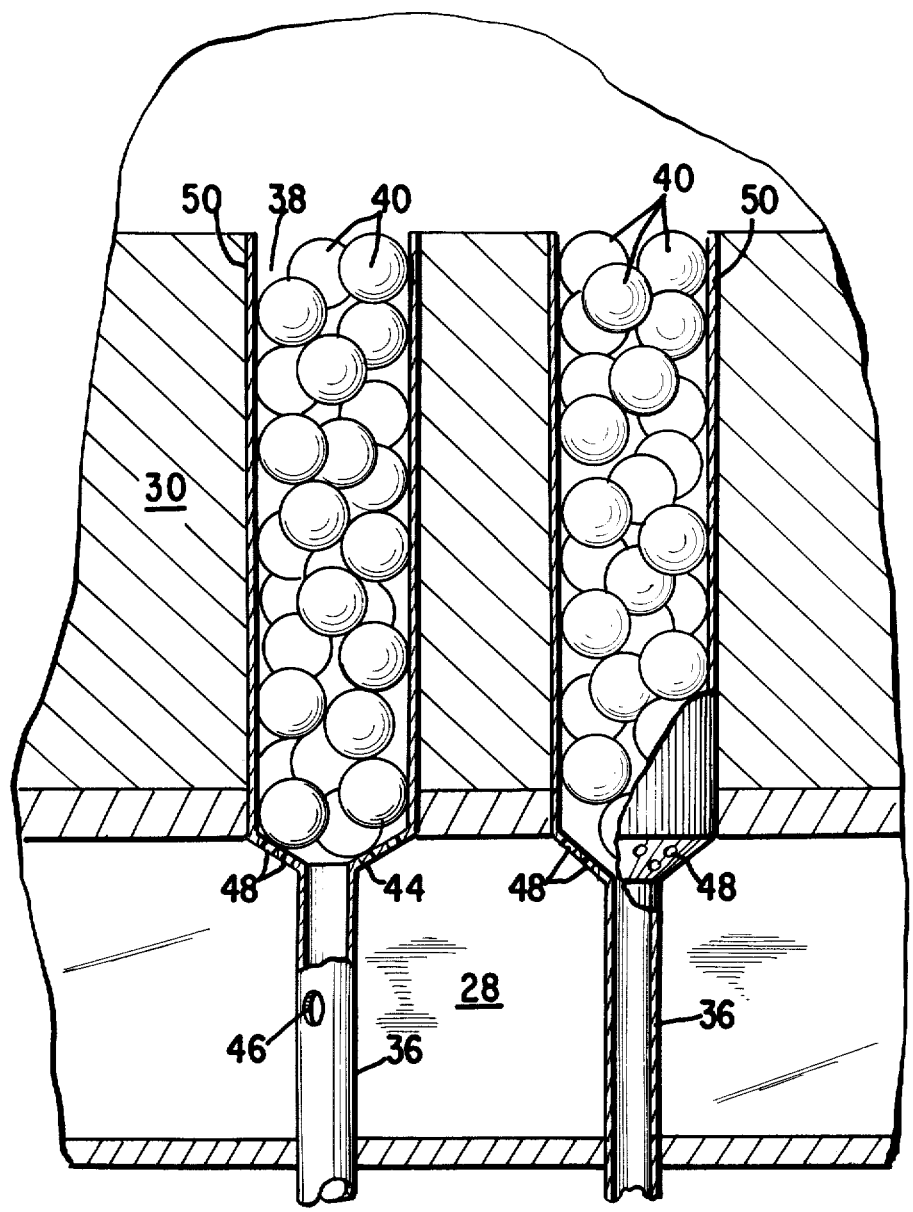

For a complete description of the invention, reference is hereby made to the drawing wherein FIG. 1 is a cross-sectional view of a fluid bed reactor having a perforated grid which forms the bottom thereof and through which a mixture of air and fuel is admitted to create a fluidized bed of solid particles entrained in the turbulent fuel-air mixture; and FIG. 2 is an enlarged view of a portion of the grid illustrating the construction details of the combustion chambers filled with small objects which facilitate mixing of fuel and air.

Referring not to the preferred embodiment shown in FIG. 1, fluid bed reactor 10 is lined with a refractory lining 12 which must withstand high temperatures, depending on the particular application for which the reactor is used. The reactor can be used for defluorinating phosphate rock, production of cement clinker, treatment of limestone to drive-off carbon dioxide and for calcining operations to drive-off organics. In defluorinating phosphate rock, temperatures in the range of 2200° to 2700°F are encountered which dictate a refractory which can withstand a temperature of about 3000°F because of the imminent presence of hot spots in the reactor during operation. As for the other applications, cement clinker production is carried out at 2400° to 2800°F, limestone treatment at 1500° to 2000°F and calcining to drive-off organics, at 1300° to 1700°F. The refractory should be selected so that it could withstand temperatures well in excess of the temperature in the fluidized bed to provide an adequate margin of safety.

Particulate material for fluid bed 14 may be charged to the reactor through gravity feed pipe 16 or through pneumatic feed system 18. For phosphate rock defluorination feed may consist of a wide variety of particle size distributions: For example for prenodulized feed the particulate feed material may be fluorine-containing rock having a particle size of from −¼ inch to +35 mesh Tyler Standard; for nonagglomerated feed in accordance with the practice of U.S. Pat. No. 3,336,008 the particulate material is fluorine-containing rock of a particle size less than about 10 mesh Tyler Standard; and for thin-film feed the particle size should be less than 100 mesh Tyler Standard. Coarser particles up to about 6 mesh handle nicely in the reactor but require higher temperature to defluorinate.

Thin-film defluorination, mentioned above, is the subject of copending application No. Ser. No. 179,523, filed Sept. 10, 1971 and now abandoned. The present invention is particularly useful in the practice of thin-film defluorination because it promotes efficient combustion within the bed. Thus the present invention counteracts the tendency for finely divided rock particles to inhibit proper combustion within the bed and to promote undesirable and inefficient combustion above the bed. It has been found that particle size fractions of rock less than 100 mesh are advantageous since in this range thin-film defluorination is obtained. As each particle is defluorinated, additional particles will agglomerate the existing defluorinated particles thus increasing size of the rock by the so-called onion effect. Successive layers of small particles adhere to previously defluorinated layers resulting in a rapid and continuous defluorination of the rock and at the same time increasing the size of the particles. When coarser particles than 100 mesh are used as feed, as in the direct method of defluorination where the particulate feed and the reagents are introduced into the fluid bed simultaneously, it is evident that additional time or higher temperature is required for the fluorine to escape from the interior of the particles and for the defluorination reagent to penetrate into the interior.

Defluorinating reagents used can be any phosphorus-containing materials capable of reacting with the phosphate rock. It is preferred to use phosphoric acid or sodium phosphate since these will also increase the $P_2O_5$ level of the phosphate rock but, $H_2SO_4$ and HCl can also be used. Enough of phosphoric acid or sodium phosphate has been added in the past to provide about 10% added $P_2O_5$ in the product. It is, in some cases, preferred to add other materials such as soda ash, caustic soda together with silica, if necessary, potash and the like in order to aid in the defluorination and to improve the phosphate availability of the defluorinated rock. About 7% soda ash or caustic soda is generally added.

Air for the purpose of fluidizing the bed and for supporting combustion is compressed by blower 24 and directed through duct 26 into windbox 28 from which it flows into reactor 10 through grid 30 made from a refractory material. Fuel, such as natural gas, from supply 32 flows through pipe 34 and into individual feed conduits 36. The preferred air-gas mixture for combustion ranges from stoichiometric to 10% excess air, using natural gas. For most commercially available natural gases, this ratio is 10.2 to 11.0 CFM of air for each CFM of natural gas. Each fuel conduit has one or more openings in windbox 28 which permit air to enter and mix with the fuel. The fuel conduits supply the fuel-air mixture to each of the mixing chambers 38 in grid 30. Mixing chambers 38 are filled with refractory packing 40 which can be of any desired shape.

Finished product, such as defluorinated phosphate rock particles, is removed through overflow discharge 20 or through an underflow discharge 22. In an alternate embodiment, a central discharge can be provided through the grid in conjunction with an overflow discharge to remove product and lumps that otherwise would grow by accretion of particles and cause difficulties. An actual experiment proved the feasibility of this idea. To facilitate removeal, the upper surface of the grid should be provided with a slight pitch toward the central discharge.

Finer particles from the fluidized bed are carried upwardly by the fluidizing gases into cyclone 42 where they are separated from the gases. These particles may be recycled into the reactor, after optional agglomeration, for further processing. In defluorination operations, the fine particles collected in cyclone 42 may be combined with the product without being recycled for re-processing if the fluorine content of the product is low enough to produce a specification product.

FIG. 2 illustrates in more detail the configuration of mixing chambers 38 and grid 30. Mixing chambers 38 are cylindrical cavities which are filled with packing 40 made of a refractory material the fusion point of which is above the temperature generated in the reactor. Mixing chambers can assume other configurations than cylindrical, as for example, square or rectangular in cross-section. Diameter and extent of the chambers when filled with objects 40, must be less than that which is necessary for efficient combustion of the fuel-air mixture. This condition contributes to the control of the level at which burning takes place in that, since the filled chambers are too small to promote efficient burning, the fuel-air mixture will ignite and burn when it leaves the chambers at a point adjacent the upper surface of the grid.

In the preferred embodiment, stainless steel tubes 50 are positioned within chambers 38. The tubes are connected to the gas feed line 36 through frusto-conical sections 44. Air in windbox 28 enters gas feed line 36 through openings 46. Openings 48 in the frusto-conical section 44 may be provided for the same purpose. Size and number of openings 46 and 48 are chosen so as to provide a suitable pressure drop under the operating conditions and to facilitate proper mixing of fuel and air.

Based on empirical data, the mixing chambers can have diameters in the range of from 1 to 6 inches and preferably from 1.5 to 3 inches and their length may be from 3 inches and up. Preferably, the length of the mixing chambers is from 6 to 18 inches. From pilot plant studies, it appears that the optimum diameter of the mixing chambers is about 2 inches. Practical limit on the length of the mixing chambers is governed by the thickness of the grid which is required to provide adequate structural integrity and insulation. Total open area per square foot of the grid is from 3 to 14 in$^2$ and preferably from 6 to 10 in$^2$. The mixing chamber diameter may be varied above or below 2 inches but it must be recognized that comparable space rates must be maintained. If the space rate within the mixing chambers is too low, the combustion reaction will be allowed to go to completion within the chambers causing very high temperatures. Space rates must also be high enough to prevent the fluidized particles from entering the chambers. On the other hand, the space rates cannot be so high as to blow the packing out of the combustion chambers. For material weighing from 50 to 120 lbs/ft$^3$ and having a particle size less than about one half inch, suitable space rates in the bed section of the reactor are from 2 to 12 ft/sec, and preferably from 5 to 9 ft/sec.

The size of the packing diameter relative to the size of the mixing chamber may be varied but, of course, cannot exceed diameter of the chamber. The lower limit on the size of the packing is determined by the space velocity which would blow the packing out of the mixing chambers and numerical values for such packing depend on such factors as operating temperature, space rate of the fluidizing gas mixture and size, shape and density of the packing.

It appears that the shape of the packing is not an important variable. Various regular and irregular shapes of the packing can be used which include spheres, cubes, rings, saddles, egg shapes and various irregular fragments. Spheres and cubes are preferred and in terms of these packings, the size thereof is normally from ½ to 2.5 inches and preferably, about 1 inch along its longest dimension. As an alternative to loose packing, the mixing chambers can be fitted with suitable baffles or projections. A series of straight or warped baffles is preferred. The packing, baffles and projections must be made of a suitable material which is strong enough to withstand temperatures likely to be encountered. For this reason, suitable non-metallic refractory materials are preferred for the packing such as high alumina, silicon carbide and high magnesia refractory. Suitable metallic packing, baffles and projections may serve as well. Preferred material for packing is 99% alumina since it can withstand a temperature of 3300°F.

An example of a commercial grid is a circular disk made of high alumina refractory which is 12 inches in thickness and 12 ft. in diameter. It is provided with 280 holes 2 inches in diameter.

The fluid bed reactor described herein has several important advantages. Empirical data on the pilot fluid bed reactor has shown that production can be increased by more than 25%. Since efficient combustion is effected substantially at the level of the grid, fuel efficiency is increased and burning above the fluidized bed is eliminated. Also, necessity for preheating fluidizing air is eliminated as a result of efficient and complete combustion of the fuel-air mixture within the reactor. Another important advantage which the novel reactor can be credited with when it is applied to defluorinating phosphate rock by thin-film technique is the complete or partial elimination of defluorinating reagents normally used in that operation. This makes it possible to reduce the cost of defluorination phosphate product by 20% and more. Furthermore, the novel reactor is much more efficient in defluorinating phosphate rock in that when combustion takes place at the grid, water vapor formed by combustion passes through the entire bed thus enhancing defluorination, which is not the case when combustion takes place well above the level of the grid.

Empirical data presented below shows that with the novel reactor, defluorinated phosphate rock was produced at a rate of up to 1200 lbs/hr whereas with the same reactor fitted with a conventional grid, the rate of only 800 lbs/hr was approached.

The following examples are presented for the purpose of illustrating the fluid bed reactor provided with a grid which permits burning of the fuel-air mixture substantially at the level of the grid with the consequent improvement resulting from the permeating effect of the combustion gases on the fluidized particles above the grid.

EXAMPLE I

To defluorinate phosphate rock, 2-inch stainless steel cylinders 9½ inches in length were welded to air-inlet rings. Each air-inlet ring, which corresponds to the frusto-conical section 44 in FIG. 2, had 18 air-inlet openings 7/64 inches in diameter, corresponding to openings 48 in FIG. 2. The cylinders were filled with 1-inch balls composed of 99% alumina and the space above the windbox and below the top of the cylinders are filled with high temperature insulation to form the grid. A total of 28 cylinders were installed in a grid 48 inches in diameter. The reactor was 23 feet 8 inches high, measured from the top of the grid to the roof of the reactor, and was fitted with a pair of cyclones disposed in series.

| Reactor Data | |
|---|---|
| duration of test | 8 hrs |
| bed temperature | 2530°F |
| freeboard temperature | 2350°F |
| windbox pressure | 2.7 psi |
| space rate of fluidizing air | 6.77 ft/sec |
| space rate of total air | 7.28 ft/sec |
| ratio air/natural gas | 10.4/1 |
| feed rate | 1102 lbs/hr |

Clinker and Dust Data
Clinker    No. 1 Dust    No. 2 Dust

| lbs/hr | wt % | % F | lbs/hr | wt % | % F | lbs/hr | wt % | % F |
|---|---|---|---|---|---|---|---|---|
| 804 | 81.1 | 0.12 | 179 | 18.1 | 0.74 | 8 | 0.8 | 1.14 |

The phosphate feed included 83% phosphate rock, 10% added $P_2O_5$ and 7% $Na_2O$. Chemical analyses of the feed, clinker, and dust are given below.

| | Chemical Analysis | | | |
|---|---|---|---|---|
| P | Feed 16.2 | Clinker 18.3 | No. 1 Dust 18.1 | No. 2 Dust 17.6 |
| % of Total P Soluble In | | | | |
| 2% Citric Acid | — | 96 | — | — |
| NAC* | — | 96 | — | — |
| 0.4% HCl | — | 100 | — | — |
| CaO | 40.7 | 44.9 | 44.8 | 44.8 |
| $Na_2O$ | 6.5 | 7.9 | 7.0 | 7.2 |
| $SiO_2$ | 2.3 | 2.8 | 2.7 | 2.5 |
| $F_1$ | 3.20 | 0.12 | 0.74 | 1.14 |
| Size Analysis | | | | |
| +10 | 5 | 27 | — | — |
| 10 × 14 | 9 | 29 | — | — |
| 14 × 20 | 20 | 20 | — | — |
| 20 × 28 | 27 | 8 | 0 | 0 |
| 28 × 35 | 17 | 4 | 5 | 2 |
| 35 × 48 | 10 | 12 | 48 | 15 |
| 48 × 65 | 7 | — | 24 | 28 |
| 65 × 100 | 5 | — | 18 | 34 |
| 100 × 150 | — | — | 3 | 11 |
| −150 | — | — | 2 | 10 |

-continued

| | Chemical Analysis | | | |
|---|---|---|---|---|
| P | Feed 16.2 | Clinker 18.3 | No. 1 Dust 18.1 | No. 2 Dust 17.6 |
| | 100 | 100 | 100 | 100 |

*Neutral Ammonium Citrate.

EXAMPLE II

Procedure of Example I was followed using the same reactor but varying some parameters to determine effect of space rate on feed rate and production of clinker, dust and product. Space rate is defined as the velocity of the gases in the fluidizing area expressed in feet per second. The data is summarized in Table 1, below, where test H represents results of Experiment I.

Table 1

| Test | Hrs | Bed Temp. °F | Space Rate Ft/Sec Fluidizing | Space Rate Ft/Sec Total* | Total Air/Gas Ratio | Feed Lb/Hr | Clinker Lb/Hr | Clinker % F | Dust Lb/Hr | Dust % F | % of Feed |
|---|---|---|---|---|---|---|---|---|---|---|---|
| A | 9 | 2510 | 5.21 | 5.84 | 9.8 | 804 | 635 | .10 | 106 | .69 | 13.2 |
| B | 8 | 2510 | 5.42 | 6.05 | 10.0 | 883 | 702 | .10 | 128 | .76 | 14.5 |
| B' | 7 | 2520 | 5.42 | 6.06 | 9.9 | 893 | 680 | .14 | 126 | .75 | 14.1 |
| C | 8 | 2510 | 5.67 | 6.30 | 10.1 | 923 | 666 | .12 | 151 | .79 | 16.4 |
| C' | 8 | 2520 | 5.67 | 6.31 | 10.2 | 915 | 691 | .11 | 124 | .83 | 13.5 |
| D | 10 | 2510 | 5.83 | 6.47 | 10.2 | 958 | 730 | .11 | 149 | .83 | 15.6 |
| D' | 8 | 2510 | 5.83 | 6.47 | 10.2 | 909 | 667 | .13 | 111 | .84 | 12.2 |
| E | 8 | 2510 | 6.11 | 6.75 | 10.3 | 924 | 686 | .09 | 168 | .71 | 18.2 |
| E' | 7 | 2510 | 6.08 | 6.70 | 10.2 | 952 | 756 | .13 | 154 | .81 | 16.2 |
| F | 8 | 2540 | 6.39 | 6.90 | 10.6 | 998 | 768 | .11 | 167 | .81 | 16.7 |
| G | 8 | 2510 | 6.57 | 7.08 | 10.6 | 1138 | 837 | .14 | 211 | .94 | 18.5 |
| H | 8 | 2530 | 6.77 | 7.28 | 10.4 | 1102 | 804 | .12 | 187 | .76 | 17.0 |
| I | 10 | 2540 | 7.03 | 7.67 | 10.4 | 1164 | 837 | .12 | 204 | .85 | 17.5 |
| J | 8 | 2540 | 7.29 | 7.80 | 10.5 | 1224 | 901 | .13 | 217 | .78 | 17.7 |
| K | 10 | 2550 | 7.51 | 8.02 | 10.0 | 1243 | 887 | .10 | 241 | .65 | 19.4 |
| L | 8 | 2540 | 7.78 | 8.29 | 10.2 | 1213 | 887 | .10 | 233 | .57 | 19.2 |
| M | 4 | 2570 | 7.84 | 8.36 | 10.3 | 1179 | 783 | .09 | 105 | .51 | 11.0 |
| N | 12 | 2440 | 7.00 | 7.50 | 11.2 | 1076 | 761 | .12 | 239 | .94 | 22.2 |
| O | 8 | 2470 | 7.11 | 7.60 | 10.6 | 1174 | 744 | .14 | 233 | .91 | 19.8 |
| P | 8 | 2470 | 7.35 | 7.85 | 11.0 | 1151 | 791 | .10 | 260 | .80 | 22.6 |
| Q | 8 | 2480 | 7.37 | 7.87 | 10.7 | 1176 | 734 | .14 | 286 | .86 | 24.2 |

*Includes feed injection air and fluidizing air.

The results in the above table show that the space rate was varied from about 6 to 8 ft/sec which resulted in the feed rate increase from 870 lbs/hr to over 1200 lbs/hr. A temperature of 2510°F was needed for defluorination at lower feed and space rates whereas it was raised to 2540°F at higher feed and space rates. As is apparent from the data, percent of dust decreases with increase in temperature. In test M, the reactor was operated for 4 hours at 2570°F but there was a tendency for the feed to ball at this high temperature. While operating at 2570°F, the combined clinker-dust, i.e. the product, met fluorine, solubility, and other specifications for animal feed supplement which requires at least 100:1 ratio of phosphorus to fluorine and at least 70% solubility in 2% citric acid solution, neutral ammonium citrate and 0.4% hydrochloric acid solution for good biological availability.

The fact that combined clinker-dust, i.e. product, meets specifications for animal feed supplement is important since, as is evident from the data in Table 1, fluorine content in dust greatly exceeds the fluorine specification. To utilize dust, it was necessary, in the past, to recycle it to the reactor for further defluorination because the fluorine content of clinker was not low enough to off-set the high fluorine content in the dust when the two were combined. Data in Table 1 shows that the novel reactor is a very efficient defluorination apparatus and clinker and dust can be combined to produce a product meeting the fluorine and other specifications for animal feed supplement.

Tests A through L were run at substantially similar temperatures but the space rate was varied to determine effect on feed rate and production of clinker, dust and total product. Test M was run at abnormally high temperature of 2570°F and had only 75% by weight recovery, versus the normal of about 90%. Tests N through Q were run at abnormally low temperatures of 2440° to 2480°F, which is an indication that a feed of different composition entered the reactor. This is true also of Tests O, P, and Q. All tests indicate a direct relationship between space rate and feed rate. With a space rate of 6 ft/sec, feed rate was 870 lbs/hr while at a space rate of 8 ft/sec, it was 1200 lbs/hr. Temperature of 2510°F was used for the lower feed rate and a temperature of 2540°F, for the higher feed rate. The space rate is actually a function of the amount of oxygen: the greater amount of oxygen, the greater the space rate and the greater the quantity of natural gas that can be burned.

What is claimed is:

1. In a fluid bed reactor which includes a perforated grid, means for introducing particulate matter into said reactor, means for introducing fuel and air into said reactor for fluidizing the particulate matter and for affecting a thermal reaction between the particulate matter and the combusted air and fuel mixture and means for withdrawing treated particles from the reactor, the improvement comprising combustion chambers in said grid from 1 to 6 inches wide and of a length equivalent to the thickness of said grid and interference means provided in said chambers, the fuel and air being introduced into said chambers where they are mixed with the aid of said interference means and combusted within said fluidized bed of particles just above said grid.

2. Reactor of claim 1 wherein said interference means is packing disposed within said chambers which is from ½ to 2.5 inches along its longest dimension and the total open area per square foot of said grid is from 3 to 14 in$^2$.

3. Reactor of claim 2 wherein said chambers are cylindrical 1.5 to 3 inches in diameter and from 6 to 18 inches long.

4. Reactor of claim 3 wherein said chambers are cylindrical and said packing is 99% alumina and is selected from regular and irregular geometric shapes.

5. Reactor of claim 3 wherein said feed particles are phosphate rock particles of up to 6 mesh, Tyler Standard, having a density of 50 to 120 lbs/ft$^3$; and space rate of the fuel-air mixture is from 2 to 12 ft/sec.

6. Reactor of claim 5 wherein said feed particles are phosphate rock particles passing through 100 mesh, Tyler Standard; the space rate of the fuel-air mixture is 5 to 9 ft/sec; and the open area per square foot of said grid is from 6 to 10 in$^2$.

7. Reactor of claim 6 wherein said mixing chambers are about 2 inches in diameter and said packing is loose packing which is selected from spheres, cubes, rings, saddles and egg shapes.

8. Reactor of claim 7 wherein said packing is 99% alumina spheres about 1 inch in diameter and wherein said reactor components are amde of refractory material which can withstand operating temperatures.

9. A grid comprising mixing chambers extending through said grid of a size which inhibits burning of fuel and air therein and packing material disposed in said chambers to promote mixing of fuel and air, the total open area per square foot of said grid is from 3 to 14 in$^2$.

10. Grid of claim 9 where said mixing chambers are from 1 to 6 inches wide and at least about 3 inches long, said packing having the longest dimension of from ½ to 2.5 inches and being of a refractory material.

11. Grid of claim 10 which is made of a refractory material, said mixing chambers are from 1.5 to 3 inches wide and 6 to 18 inches long, and said packing is selected from spheres, cubes, rings, saddles and egg shapes.

12. Grid of claim 11 wherein said mixing chambers are cylindrical and said packing is made from 99% alumina.

13. Grid of claim 12 wherein said mixing chambers having a diameter of about 2 inches and said packing is 99% alumina spheres of about 1 inch in diameter.

* * * * *